United States Patent
Maeder et al.

(10) Patent No.: US 11,765,575 B2
(45) Date of Patent: Sep. 19, 2023

(54) APPARATUS, METHOD AND COMPUTER PROGRAM

(71) Applicant: NOKIA TECHNOLOGIES OY, Espoo (FI)

(72) Inventors: Andreas Maeder, Würzburg (DE); Peter Rost, Heidelberg (DE); Christian Mannweiler, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 196 days.

(21) Appl. No.: 17/299,411

(22) PCT Filed: Dec. 4, 2018

(86) PCT No.: PCT/EP2018/083495
§ 371 (c)(1),
(2) Date: Jun. 3, 2021

(87) PCT Pub. No.: WO2020/114578
PCT Pub. Date: Jun. 11, 2020

(65) Prior Publication Data
US 2022/0078606 A1 Mar. 10, 2022

(51) Int. Cl.
*H04L 61/5007* (2022.01)
*H04L 61/5061* (2022.01)
*H04W 8/26* (2009.01)
*H04W 8/18* (2009.01)

(52) U.S. Cl.
CPC ........... *H04W 8/26* (2013.01); *H04L 61/5007* (2022.05); *H04L 61/5061* (2022.05); *H04W 8/186* (2013.01)

(58) Field of Classification Search
None
See application file for complete search history.

(56) References Cited

U.S. PATENT DOCUMENTS

| | | | |
|---|---|---|---|
| 6,687,252 B1 | 2/2004 | Bertrand et al. | |
| 8,214,477 B2 | 7/2012 | Battello et al. | |
| 8,321,567 B1 | 11/2012 | Sheth | |
| 8,725,860 B1 | 5/2014 | Voltmer et al. | |

(Continued)

FOREIGN PATENT DOCUMENTS

| | | | |
|---|---|---|---|
| EP | 3 185 516 A1 | 6/2017 | |
| WO | WO-2017218775 A1 * | 12/2017 | ............ H04W 12/06 |

OTHER PUBLICATIONS

"3rd Generation Partnership Project; Technical Specification Group Services and System Aspects; Policy and Charging Control Framework for the 5G System; Stage 2 (Release 15)", 3GPP TS 23.503 v15.1.0, (Mar. 27, 2018), 65 pages.

(Continued)

*Primary Examiner* — Ajit Patel
(74) *Attorney, Agent, or Firm* — ALSTON & BIRD LLP (57) ABSTRACT

An apparatus comprising means for performing: storing information of a plurality of user equipment addresses, the user equipment addresses allocated to one or more network slices; partitioning the plurality of user equipment addresses in to two or more groups; providing information of each of the two or more groups to one or more network functions in a network or network slice; and updating the stored information of a plurality of user equipment addresses based on information of utilization of addresses.

13 Claims, 6 Drawing Sheets

(56) References Cited

U.S. PATENT DOCUMENTS

| | | |
|---|---|---|
| 2018/0227267 A1 | 8/2018 | Joul |
| 2019/0098536 A1* | 3/2019 | Qiao .................... H04W 36/32 |
| 2019/0166467 A1* | 5/2019 | Livanos ................ H04W 48/00 |
| 2019/0223023 A1* | 7/2019 | Altay .................. H04L 41/5051 |
| 2021/0160680 A1* | 5/2021 | Velev ..................... H04W 4/50 |
| 2021/0204103 A1* | 7/2021 | Bartolomé Rodrigo ..................... H04L 63/0428 |
| 2021/0321466 A1* | 10/2021 | Colom Ikuno ....... H04W 76/10 |

OTHER PUBLICATIONS

"3rd Generation Partnership Project; Technical Specification Group Services and System Aspects; Study on Enhancing Topology of SMF and UPF in 5G Networks (Release 16)", 3GPP TR 23.726 v1.3.0, (Oct. 31, 2018), 94 pages.

"3rd Generation Partnership Project; Technical Specification Group Services and System Aspects; Study on the Wireless and Wireline Convergence for the 5G system architecture (Release 16)", 3GPP TR 23.716 v0.7.0, (Sep. 4, 2018), 134 pages.

"3rd Generation Partnership Project; Technical Specification Group Services and System Aspects; System Architecture for the 5G System; Stage 2 (Release 15)", 3GPP TS 23.501 v15.2.0, (Jun. 19, 2018), 217 pages.

International Search Report and Written Opinion for Patent Cooperation Treaty Application No. PCT/EP2018/083495 dated Aug. 9, 2019, 13 pages.

T-Mobile USA Inc., "IP Index for IP Address Allocation based on PCF", SA WG2 Meeting #120, S2-172020, (Mar. 27-31, 2017), 4 pages.

Sedayao, J., "IPv4 Address Use in Planetlab", (Apr. 2004), 8 pages.

"Managing IP Address Pools", Cisco Prime Network 4.2.3 User Guide, Chapter 14, (Nov. 16, 2016), 4 pages.

Office Action for European Application No. 18815988.3 dated Jul. 18, 2023, 5 pages.

* cited by examiner

APPARATUS, METHOD AND COMPUTER PROGRAM

CROSS-REFERENCE TO RELATED APPLICATIONS

This application is a national phase entry of International Application No. PCT/EP2018/083495, filed Dec. 4, 2018, the entire contents of which are incorporated herein by reference.

FIELD

This disclosure relates to communications, and more particularly to dynamic address allocation in a wireless communication system.

BACKGROUND

A communication system can be seen as a facility that enables communication between two or more devices such as user terminals, machine-like terminals, base stations and/or other nodes by providing communication channels for carrying information between the communicating devices. Non-limiting examples of services provided include two-way or multi-way calls, data communication or multimedia services and access to a data network system, such as the Internet.

Since introduction of fourth generation (4G) services increasing interest has been paid to the next, or fifth generation (5G) standard. 5G may also be referred to as a New Radio (NR) network. Standardization of 5G or New Radio networks is an on-going study item.

Network slicing is a form of virtual network architecture. Network slicing allows multiple virtual networks to be created on top of a common shared physical infrastructure. Each network slice comprises an independent set of logical network functions that support the requirements of the particular use case.

IP address management (IPAM) is a technique for management of IP-based networks.

Statement of Invention

According to a first aspect there is provided an apparatus comprising means for performing: storing information of a plurality of user equipment addresses, the user equipment addresses allocated to one or more network slices; partitioning the plurality of user equipment addresses in to two or more groups; providing information of each of the two or more groups to one or more network functions in a network or network slice; and updating the stored information of a plurality of user equipment addresses based on information of utilization of the addresses.

According to an example the means are further configured to perform partitioning the plurality of user equipment addresses into two or more groups based upon one or more of: radio access type; network traffic information; location information of the one or more network functions and/or subscription information.

According to an example the means are further configured to perform partitioning the plurality of user equipment addresses into two groups, a first of the two groups comprising subscribers of a first radio access type and a second of the two groups comprising subscribers of a second radio access type.

According to some examples, the first and second radio access types are of two or more radio access types (i.e. there may be more than two different radio access types).

According to some examples the first radio access type comprises a 5G network, and the second radio access type comprises a 4G network.

According to an example the providing information of each of the two or more groups comprises sending information of the first group to a first network function of a first network associated with the first radio access type, and sending information of the second group to a second network function of a second network associated with the second radio access type.

According to an example the first network function is comprised in a session management function entity. According to an example the second network function is comprised in a packet data network gateway entity.

According to an example the utilization information comprises information of one or more of: addresses that are in use; addresses that are available; location information of user equipment associated with the addresses.

According to an example the utilization information is received from a network data analytics function (NWDAF).

According to an example the means are further configured to perform receiving information updates of one or more subscribers.

According to an example the information updates of one or more subscribers comprises information of a number of subscribers and access type information of the subscribers. According to an example the update information of subscribers is received from an operations, administration, and maintenance (OAM) node. The one or more subscribers may comprise subscribers associated with the already stored addresses. The one or more subscribers may also comprise new subscribers.

According to an example the means are further configured to perform the updating the stored information of a plurality of user equipment addresses based at least in part on the received information updates of one or more subscribers.

According to an example the user equipment addresses comprise internet protocol addresses.

According to an example the user equipment addresses comprise Ethernet MAC address prefixes.

According to an example the means are further configured to perform handling multiple network slices.

According to an example the partitioning the plurality of user equipment addresses in to two or more groups comprises allocating a first of the two or more groups to a first network slice, and allocating a second of the two or more groups to a second network slice.

According to an example the means are further configured to perform requesting usage of a portion of the plurality of user equipment addresses from the one or more network functions.

According to an example the means are further configured to perform allocating a plurality of addresses to a user equipment; and wherein said user equipment is configured to allocate said addresses to a plurality of further user equipment in a local network.

According to an example the apparatus comprises an address allocation policy function.

According to an example the means comprises at least one processor; and at least one memory including computer program code, the at least one memory and computer program code configured to, with the at least one processor, cause the performance of the apparatus.

According to a second aspect there is provided an apparatus comprising at least one processor; and at least one memory including computer program code; the at least one memory and the computer program code configured to, with the at least one processor, cause the apparatus at least to perform: storing information of a plurality of user equipment addresses, the user equipment addresses allocated to one or more network slices; partitioning the plurality of user equipment addresses in to two or more groups; providing information of each of the two or more groups to one or more network functions in a network or network slice; and updating the stored information of a plurality of user equipment addresses based on information of utilization of the addresses.

According to an example the at least one memory and the computer program code configured to, with the at least one processor, cause the apparatus at least to perform partitioning the plurality of user equipment addresses into two or more groups based upon one or more of: radio access type; network traffic information; location information of the one or more network functions and/or subscription information.

According to an example the at least one memory and the computer program code configured to, with the at least one processor, cause the apparatus at least to perform partitioning the plurality of user equipment addresses into two groups, a first of the two groups comprising subscribers of a first radio access type and a second of the two groups comprising subscribers of a second radio access type.

According to some examples, the first and second radio access types are of two or more radio access types (i.e. there may be more than two different radio access types).

According to some examples the first radio access type comprises a 5G network, and the second radio access type comprises a 4G network.

According to an example the providing information of each of the two or more groups comprises sending information of the first group to a first network function of a first network associated with the first radio access type, and sending information of the second group to a second network function of a second network associated with the second radio access type.

According to an example the first network function is comprised in a session management function entity. According to an example the second network function is comprised in a packet data network gateway entity.

According to an example the utilization information comprises information of one or more of: addresses that are in use; addresses that are available; location information of user equipment associated with the addresses.

According to an example the utilization information is received from a network data analytics function (NWDAF).

According to an example the at least one memory and the computer program code configured to, with the at least one processor, cause the apparatus at least to perform receiving information updates of one or more subscribers.

According to an example the information updates of one or more subscribers comprises information of a number of subscribers and access type information of the subscribers. According to an example the update information of subscribers is received from an operations, administration, and maintenance (OAM) node. The one or more subscribers may comprise subscribers associated with the already stored addresses. The one or more subscribers may also comprise new subscribers.

According to an example the means are further configured to perform the updating the stored information of a plurality of user equipment addresses based at least in part on the received information updates of one or more subscribers.

According to an example the user equipment addresses comprise internet protocol addresses.

According to an example the user equipment addresses comprise Ethernet MAC address prefixes.

According to an example the at least one memory and the computer program code configured to, with the at least one processor, cause the apparatus at least to perform handling multiple network slices.

According to an example the partitioning the plurality of user equipment addresses in to two or more groups comprises allocating a first of the two or more groups to a first network slice, and allocating a second of the two or more groups to a second network slice.

According to an example the at least one memory and the computer program code configured to, with the at least one processor, cause the apparatus at least to perform requesting usage of a portion of the plurality of user equipment addresses from the one or more network functions.

According to an example the at least one memory and the computer program code configured to, with the at least one processor, cause the apparatus at least to perform allocating a plurality of addresses to a user equipment; and wherein said user equipment is configured to allocate said addresses to a plurality of further user equipment in a local network.

According to an example the apparatus comprises an address allocation policy function.

According to a third aspect there is provided an apparatus comprising: storing circuitry for storing information of a plurality of user equipment addresses, the user equipment addresses allocated to one or more network slices; partitioning circuitry for partitioning the plurality of user equipment addresses in to two or more groups; providing circuitry for providing information of each of the two or more groups to one or more network functions in a network or network slice; and updating circuitry for updating the stored information of a plurality of user equipment addresses based on information of utilization of the addresses.

According to a fourth aspect there is provided a method comprising: storing information of a plurality of user equipment addresses, the user equipment addresses allocated to one or more network slices; partitioning the plurality of user equipment addresses in to two or more groups; providing information of each of the two or more groups to one or more network functions in a network or network slice; and updating the stored information of a plurality of user equipment addresses based on information of utilization of the addresses.

According to an example the method comprises partitioning the plurality of user equipment addresses into two or more groups based upon one or more of: radio access type; network traffic information; location information of the one or more network functions and/or subscription information.

According to an example the method comprises partitioning the plurality of user equipment addresses into two groups, a first of the two groups comprising subscribers of a first radio access type and a second of the two groups comprising subscribers of a second radio access type.

According to some examples, the first and second radio access types are of two or more radio access types (i.e. there may be more than two different radio access types).

According to some examples the first radio access type comprises a 5G network, and the second radio access type comprises a 4G network.

According to an example the providing information of each of the two or more groups comprises sending information of the first group to a first network function of a first network associated with the first radio access type, and sending information of the second group to a second network function of a second network associated with the second radio access type.

According to an example the first network function is comprised in a session management function entity. According to an example the second network function is comprised in a packet data network gateway entity.

According to an example the utilization information comprises information of one or more of: addresses that are in use; addresses that are available; location information of user equipment associated with the addresses.

According to an example the utilization information is received from a network data analytics function (NWDAF).

According to an example the method comprises receiving information updates of one or more subscribers (e.g. UEs).

According to an example the information updates of one or more subscribers comprises information of a number of subscribers and access type information of the subscribers. According to an example the update information of subscribers is received from an operations, administration, and maintenance (OAM) node. The one or more subscribers may comprise subscribers associated with the already stored addresses. The one or more subscribers may also comprise new subscribers.

According to an example the method comprises updating the stored information of a plurality of user equipment addresses based at least in part on the received information updates of one or more subscribers.

According to an example the user equipment addresses comprise internet protocol addresses.

According to an example the user equipment addresses comprise Ethernet MAC address prefixes.

According to an example the method comprises handling multiple network slices.

According to an example the partitioning the plurality of user equipment addresses in to two or more groups comprises allocating a first of the two or more groups to a first network slice, and allocating a second of the two or more groups to a second network slice.

According to an example the method comprises requesting usage of a portion of the plurality of user equipment addresses from the one or more network functions.

According to an example the method comprises allocating a plurality of addresses to a user equipment; and wherein said user equipment is configured to allocate said addresses to a plurality of further user equipment in a local network.

According to an example the method is carried out by an address allocation policy function.

According to a fifth aspect there is provided a computer program comprising instructions for causing an apparatus to perform at least the following: storing information of a plurality of user equipment addresses, the user equipment addresses allocated to one or more network slices; partitioning the plurality of user equipment addresses in to two or more groups; providing information of each of the two or more groups to one or more network functions in a network or network slice; and updating the stored information of a plurality of user equipment addresses based on information of utilization of the addresses.

According to a sixth aspect there is provided a computer program comprising instructions stored thereon for performing at least the following: storing information of a plurality of user equipment addresses, the user equipment addresses allocated to one or more network slices; partitioning the plurality of user equipment addresses in to two or more groups; providing information of each of the two or more groups to one or more network functions in a network or network slice; and updating the stored information of a plurality of user equipment addresses based on information of utilization of the addresses.

According to a seventh aspect there is provided a non-transitory computer readable medium comprising program instructions for causing an apparatus to perform at least the following: storing information of a plurality of user equipment addresses, the user equipment addresses allocated to one or more network slices; partitioning the plurality of user equipment addresses in to two or more groups; providing information of each of the two or more groups to one or more network functions in a network or network slice; and updating the stored information of a plurality of user equipment addresses based on information of utilization of the addresses.

According to an eighth aspect there is provided a non-transitory computer readable medium comprising program instructions stored thereon for performing at least the following: storing information of a plurality of user equipment addresses, the user equipment addresses allocated to one or more network slices; partitioning the plurality of user equipment addresses in to two or more groups; providing information of each of the two or more groups to one or more network functions in a network or network slice; and updating the stored information of a plurality of user equipment addresses based on information of utilization of the addresses.

BRIEF DESCRIPTION OF FIGURES

The invention will now be described in further detail, by way of example only, with reference to the following examples and accompanying drawings, in which.

DETAILED DESCRIPTION

IP address management (IPAM) is a technique for management of IP-based networks. IPAM in mobile networks (MN) includes planning, tracking, and management of IP addresses from a pool of IP address spaces owned or governed by a Mobile Network Operator (MNO). For example, an MNO may own IP spaces based on network classes, or based on Classless Interdomain Routing (CIDR) protocol, which uses additional network masks for finer granularity of IP spaces. The operator IP space is used both for intra-network nodes (i.e. network nodes in the radio access network (RAN) and core network as well as any other network function which uses IP transport), as well as for end devices (e.g. User Equipment—UE).

5G also introduces the concept of network slicing. A network slice corresponds to an end-to-end logical network which can be created dynamically, and is dedicated for a specific purpose. For example, an operator may offer a network service for a customer which requires that network functions and some resources (like IP addresses) are isolated from a logical point of view. This can be realized by means of a network slice which is instantiated according to the needs of the customer. As will be discussed in more detail below, the present disclosure is related to address management for end-devices (e.g. UEs).

Figure 1:
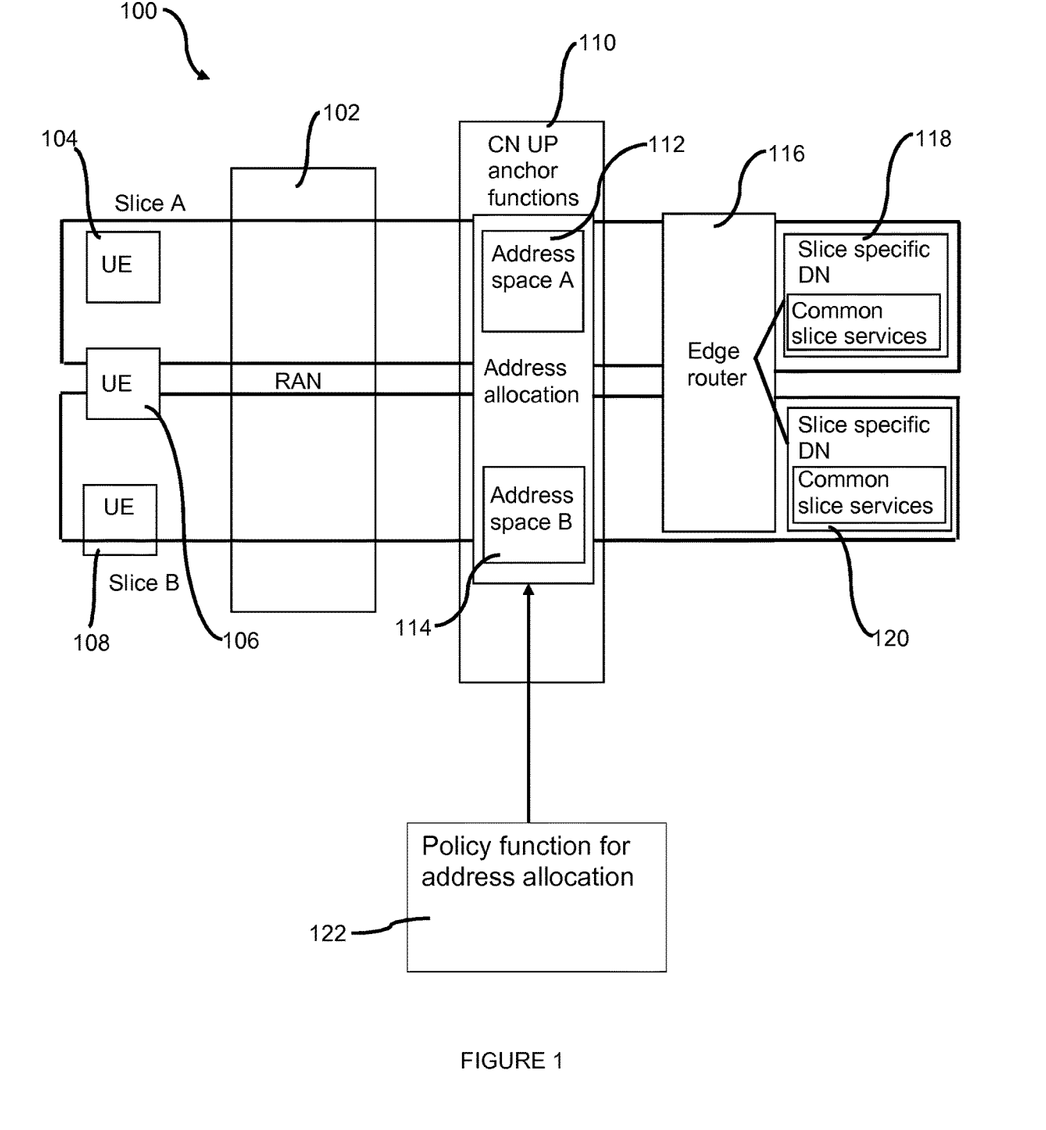
FIG. 1 shows a schematic example of some aspects of a wireless communication network.

FIG. 1 schematically shows some aspects of network slicing in a network schematically shown at 100. In this example UEs 104, 106 and 108 can communicate via radio access network (RAN) 102 and core network (CN) 110. In this example there are two network slices: slice A and slice B. UE 104 is in slice A, and UE 108 is in slice B. In this example UE 106 is in slice A and slice B. That is in some examples a UE (or indeed another network entity) may be comprised in more than one network slice simultaneously.

In the example of FIG. 1 address allocation occurs at the CN 110. For example the CN 110 can determine and/or control which network addresses are allocated to which network slice. For example slice A may be allocated address space A 112, and slice B may be allocated address space B 114. For example address space A 112 may comprise the network addresses of UEs 104 and 106, and address space B may comprise the network addresses of UEs 106 and 108.

An edge router is schematically shown at 116. The edge router 116 resides at the edge of the network 100 and may operate to connect network 100 to a wider network or another network(s). The edge router 116 may enable connection to other networks in a slice-specific manner. For example the edge router 116 may enable connection to further data network (DN) 118, which is in network slice A. Edge router 116 may also enable connection to further data network (DN) 120, which is in network slice B. The further DNs 118 and 120 may be identifiable by or addressed by corresponding data network names (DNNs). For example address space A may comprise addresses to be used for UEs connected to DN 118, and address space B may comprise addresses to be used for UEs connected to DN 120.

A policy function for address allocation is schematically shown at 122. The policy function 122 may reside in CN 110.

Network addresses for UEs (including IP addresses) are a valuable resource which need to be assigned within network slices. Address management may have to fulfil some requirements which are specific to the dynamic nature of service use. For example the present inventors have recognized that:

Operator may want (or need) to assign a specific address space to a network slice, e.g. due to service or regulatory requirements;

A customer of the network operator (that potentially also operates the network slice) may have its own address space which has to be used for UEs;

Address spaces associated with network slices may need to grow or shrink over time;

An operator may introduce new access or core technologies which should use the same UE IP address space as per the legacy deployment;

For IPv6, an operator may decide to allocate dedicated IP space to UEs in order to allow local network functionality behind the UE; e.g. based on IPv6 prefix delegation.

Moreover, several functions or function instances in the network may exist which allocate addresses to UEs. In 3GPP EPS (evolved packet system) and 5GS, these functions may include:

P-GW (packet data network gateway) (in evolved packet core (EPC) with monolithic deployment);

PGW-C (packet data network gateway control plane) (in EPC with Control/User-Plane Separation—CUPS);

SMF (session management function) (in 5GC)

The above functions may or may not use DHCP (dynamic host configuration protocol) for IP address allocation.

The present inventors have recognized that a slice-specific UE IP address space potentially needs to be managed across different address-allocating functions. There is a technical problem that the different address allocating functions may not know of the overall UE IP address status. There is also a technical problem that UE addresses may need to be re-balanced or re-allocated between functions and between slices.

For example in FIG. 1 a single policy function for address allocation is shown at 122. In real-world deployment there may be two or more address allocating policy functions.

There may also be other types of address allocating functions operating with the network. If one address allocating function attempts to or wants to allocate or re-allocate a network address, then the other address allocating functions which may be affected should be made aware.

Shortcomings of known IP address allocation schemes (e.g. allocating IP addresses in to pre-configured pools) include that the pools are pre-configured for different services (or UEs) in an inflexible manner. Network slicing is not considered in current UE IP address space management tools.

Accordingly the present application concerns an address allocation policy function (AAPF) which provides policies for address allocation. By way of non-limiting example the AAPF may for example operate in conjunction with IPv4, IPv6, and virtual Ethernet MAC.

As will be explained in more detail hereafter, the AAPF supports a definition of a dedicated address space for a network slice. For example the network slice(s) may be defined by a set of identifiers in different systems. For example the different identifiers may include S-NSSAI (network slice selection assistance information); Allowed NSSAI; DCN ID (dedicated core network identity); APN (access point name), DNN (Data Network Name); DNAI (data network access identifier).

According to some examples the AAPF provides specific partitions of the address space(s) according to one or several of the following:

access-type (e.g., E-UTRAN (Evolved Universal Terrestrial Radio Access), NG-RAN (next-generation RAN));

function (e.g., SMF (session management function), PGW, PGW-C);

function instance (e.g., based on NF (network function) identifier, IP addresses of PGW, etc.);

function name;

traffic area (TAI);

LADN ID or similar geographical concepts; or any other useful discriminator.

According to some examples the AAPF can request usage of a share or part of the allocated addresses (which may be referred to as an AAPF address fraction) from the allocating network functions. For example this may be done for the purpose of load balancing or other policy updates.

According to some examples the AAPF can set release-times for UE address allocation. For example a UE address range may be allocated to a network slice for a predetermined period of time for the purpose of address allocation to UEs. The "range" may comprise a single address or multiple addresses. In some examples, during the predetermined time period an allocated address range cannot be re-allocated to a different network slice. After the predetermined period has expired the allocated address range may be made available for re-allocation.

According to some examples the AAPF can request to trigger address renewal procedures. Address renewal may include any one or more of: allocating a UE address range to a network slice; re-allocating a UE address range from a first network slice to a second, different network slice; maintaining a UE address range in a same network slice. For example address renewal may be carried out for the purpose of load balancing. It may be determined that re-allocation of one or more UE addresses is required if slice-specific UE address ranges change, or if the allocation between range fractions need to be re-balanced.

It will be understood that the disclosed AAPF enables dynamic or "on-the-fly" management of UE IP address ranges forming IP address pools for specific services. The IP address pools can increase or decrease in size depending on need. In examples the IP address pools can also be mapped to NF instances (SMF or PGW-C, respectively) with the possibility to re-balance between different access types (e.g., E-UTRAN and NG-RAN).

The disclosed AAPF also enables address management beyond internet protocol. For example, for VMs (virtual machines), different methods are possible for MAC address creation. Moreover, in industrial networking scenarios, PCF (policy control function) could manage prefixes for MAC addresses which can then be used by UE (or applications at UE side).

Figure 2:
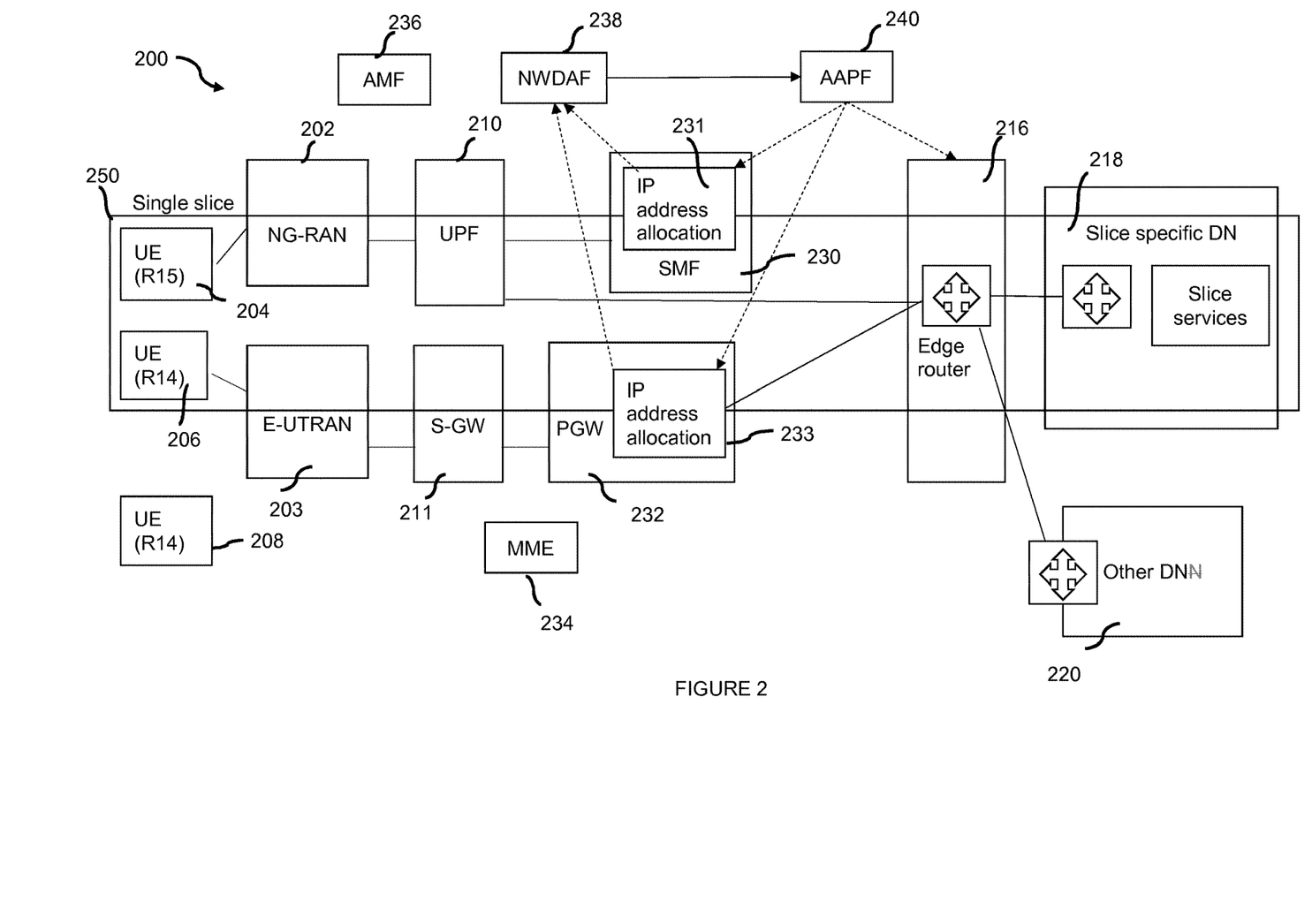
FIG. 2 shows a schematic example of some aspects of a wireless communication network according to an example.

FIG. 2 shows a network 200 in accordance with an example. In FIG. 2, UEs 204, 206 and 208 are shown. In the example of FIG. 2, UE 204 comprises a 5G UE and UEs 206 and 208 each comprise 4G UEs. The RAN comprises an NG-RAN 202 and a E-UTRAN 203. The network 200 also comprises a user plane function (UPF) 210 and a serving gateway (S-GW) 211, a session management function (SMF) 230 and a packet data network gateway (PGW) 232. The SMF 230 comprises an IP address allocation function 231, and PGW 232 comprises IP address allocation function 233. An edge router is shown at 216, which enables linking between network 200 and further networks 218 and 220. Also shown are mobility management entity (MME) 234 and access and mobility management function (AMF) 236. Network data analytics function (NWDAF) 238 is in communication with SMF 230, PGW 232 and address allocation policy function (AAPF) 240. AAPF 240 is in communication with NWDAF 238, SMF 230, PGW 232 and edge router 216.

In the example of FIG. 2, a network slice is schematically shown at 250. 5G UE 204 and 4G UE 206 are both comprised in network slice 250. Accordingly the network slice 250 is deployed in both a 5G Rel15 network and a 4G Rel14 network.

In some examples the AAPF 240 is implemented in only one of the 5G and 4G networks. In other examples the AAPF 240 may be implemented in both the 5G and 4G networks.

According to examples, the AAPF 240 determines which IP addresses are to be included in slice 250 (and indeed other network slices). Therefore it may be considered that the AAPF 240 determines UE IP address range(s) for a slice instance. In some examples each slice may comprise one or more address ranges. That is in some examples two or more address ranges may be associated with a network slice. Each IP address range may comprise a plurality of IP addresses. For example an IP address range may be based on: Single Network Slice Selection Assistance Information (S-NSSAI) in 5G; dedicated core network (DCN-ID) in 4G; or any other variable suitable to distinguish unanimously the associated address ranges. UE location information may additionally be used to determine and dimension an address range.

Therefore, for example, S-NSSAI or DCN-ID could be used for defining an address range.

Taking an initial IP address range, the AAPF 240 then splits the range in to two or more sub-ranges. In some examples the AAPF 240 initially splits the IP address range in to two sub-ranges. The splitting in to sub-ranges may be based on, for example, subscriber information received by OAM (operation, administration and management). In one example, the IP address range is initially split-up based on access network-type. For example where a group of UEs comprise some 5G UEs and some 4G UEs, then initially a first group may be formed of only 5G UEs and a second group may be formed of only 4G UEs.

Once the AAPF 240 has determined the IP address ranges, the AAPF 240 then provides the IP address ranges to one or more network nodes which require the IP address range information. For example the AAPF 240 provides the address range information to SMF 230 (or more particularly to IP address allocation function 231), and the AAPF 240 provides the address range information to PGW 232 (or more particularly to IP address allocation function 233).

In some examples the AAPF 240 may provide the address range information on a per-slice basis i.e. pertaining to more than one network slice.

According to some examples the NWDAF 238 provides IP information to AAPF 240. For example NWDAF may provide enhanced IP utilization statistics to AAPF 240. For example, the IP utilization statistics may comprise information including one or more of:

percentage of utilized and available IP addresses; instantaneous values (e.g. instantaneous values of percentage of utilized and available IP addresses); different spatial or temporal aggregation levels. In some examples the "levels" may refer to different time spans (e.g. aggregation over 10 min, 1 hour, 12 hours etc.); and/or the levels may refer to different geographical areas (e.g. 1 sqkm, 10 sqkm, or single cell vs. group of cells).

Using these statistics, the AAPF 240 can at any time request or trigger an address renewal procedure. Address renewal may comprise, for example, any one or more of: releasing an address from a group; putting an address in a group; moving an address from one group to another group. The address renewal may be carried out for load balancing purposes, for example. Or in another example the address renewal may be carried out as part of decommissioning of 4G UEs and introduction of 5G UEs, for example (e.g. based on information received from OAM). In an example the address renewal is carried out periodically. The address renewal procedure may in some examples be considered dynamic changing of address groups.

In some examples, information of the IP address space grouping or partitioning (and updates thereof) may also be provided to the edge router 216 in order to perform appropriate routing to either UPF 210 or P-GW 232. It will also be noted that in some examples the edge router function 216 may be comprised in the UPF 210.

Figure 3:
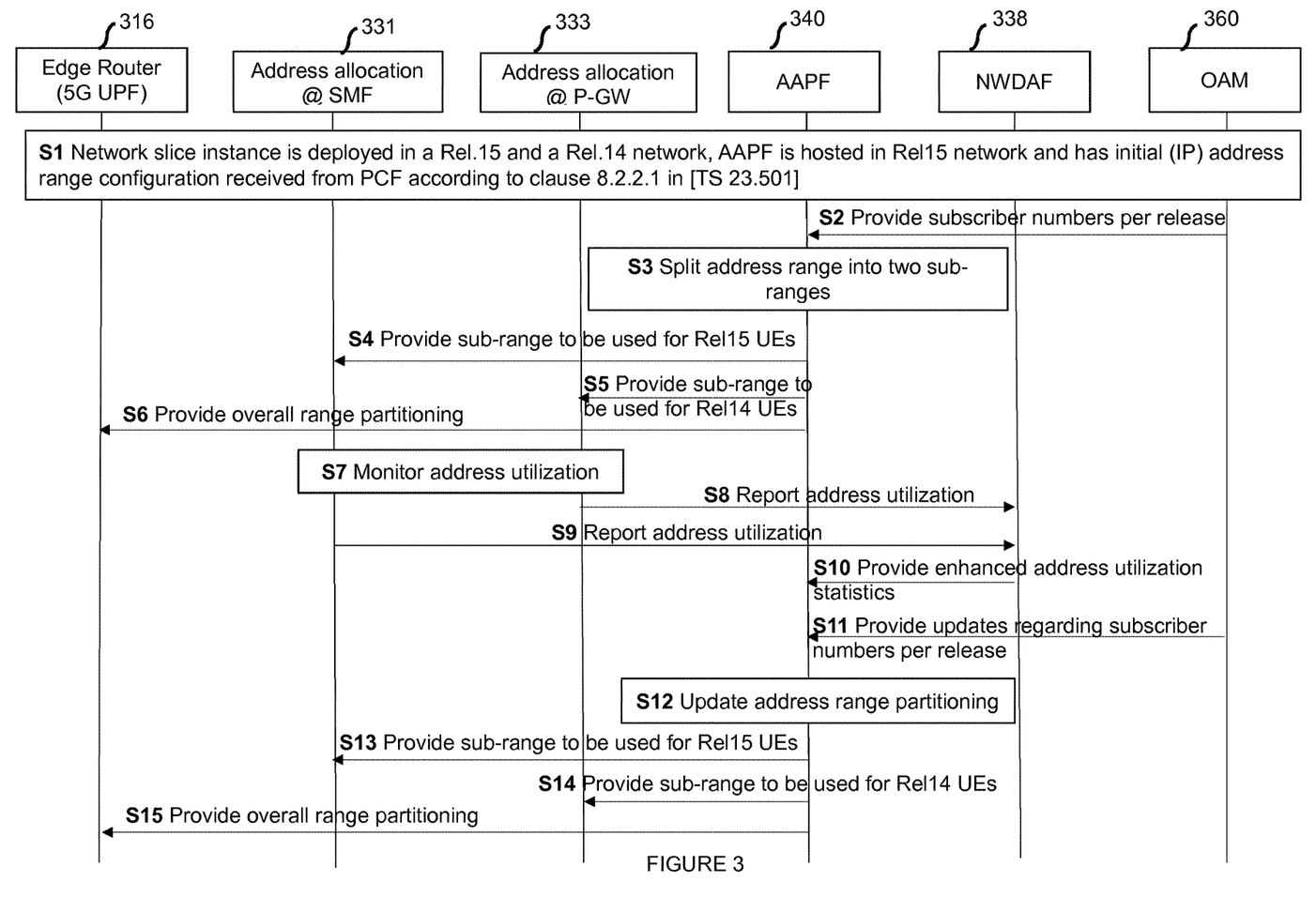
FIG. 3 is a signalling diagram of a method according to an example.

FIG. 3 is a signaling diagram of a method according to an example. FIG. 3 schematically shows signaling between an edge router 316, an address allocation function 331 at SMF, an address allocation function 333 at P-GW, AAPF 340, NWDAF 338, and OAM 360.

As shown at S1, a network slice is deployed in a 5G (Rel. 15) and a 4G (Rel. 14) network. In this example the AAPF 340 is hosted in the 5G network. The AAPF 340 has an initial (IP) address range configuration received from a PCF (e.g. according to clause 8.2.2.1 in TS 23.501).

At S2, OAM 360 provides subscriber information to AAPF 340. For example, OAM 360 may provide information of a number of subscribers per release. For example the information may comprise information of a number of 4G subscribers and a number of 5G subscribers.

At S3, the AAPF 340 splits the address range in to two sub-ranges. For example, the address range is split in to a first address range for 5G subscribers, and a second address range for 4G subscribers.

At S4 to S6 the AAPF 340 sends information of the partitioned range to the network.

More particularly, at S4 the AAPF 340 provides to the address allocation function (AAF) 331 at SMF information of a sub-range to be used for 5G subscribers (e.g. UEs).

At S5, the AAPF 340 provides to the address allocation function 333 at P-GW information of a sub-range to be used for 4G subscribers (e.g. UEs).

At S6, AAPF 340 provides information of overall range partitioning to edge router 316. For example, the overall range partitioning information sent to edge router 316 at S6 may comprise the information sent to AAF 331 of SMF and AAF 333 of P-GW at S4 and S5.

At S7, address utilization is monitored. For example AAF 331 at SMF may monitor utilization of the partitioned 5G addresses, and AAF 333 at P-GW may monitor address utilization of the partitioned 4G addresses. "Utilization" information may for example comprise information of how many (and/or which) addresses have been used, and information of how many (and/or which) addresses are still available.

Then, address utilization information is received at NWDAF 338.

More particularly, at S8 the address utilization information of 4G subscribers is sent from AAF 333 of P-GW to NWDAF 338.

At S9 the address utilization information of 5G subscribers is sent from AAF 331 of SMF to NWDAF 338.

Using the utilization information received at S8 and S9, NWDAF 338 prepares address utilization statistics, which may be considered enhanced utilization statistics. The enhanced utilization statistics may comprise information such as percentage of utilized and available IP addresses, instantaneous values and different spatial or temporal aggregation levels.

Therefore S10 may be considered preparation and sending of the enhanced utilization statistics from NWDAF 338. For example the enhanced utilization statistics may be sent from NWDAF 338 to AAPF 340.

S11 to S15 may to some extent be considered a repetition (albeit using updated information) of S2 to S6.

At S11, OAM 360 provides updates regarding subscriber numbers per release. For example the information may comprise information of a number of 4G subscribers and a number of 5G subscribers. The information of updates regarding subscriber numbers is sent to AAPF 340.

At S12, AAPF 340 updates the address range partitioning. For example, AAPF 340 determines how many subscribers are to be allocated to each group, for example based upon whether they are 5G subscribers or 4G subscribers.

The AAPF 340 then provides information regarding the address ranges to be used.

That is, at S13 AAPF 340 provides to AAF 331 of SMF a sub-range of addresses to be used for 4G UEs.

At S14, AAPF 340 provides to AAF 333 of P-GW a sub-range of addresses to be used for 5G UEs.

At S15, AAPF 340 provides information of overall range partitioning to edge router 316. For example, the overall range partitioning information sent to edge router 316 at S15 may comprise the information sent to AAF 331 of SMF and the information sent to AAF 333 of P-GW at S13 and S14.

It will be understood that examples may enable one or more of the following:

dynamic updating or steering of address allocation in one or more network slices balancing of addresses between different network slices balancing of addresses within a slice for different network functions which contain UE address allocation services dedicated allocation of addresses for different access types (e.g. NG-RAN, E-UTRAN) within one dedicated "slice" e.g. all NG-RAN addresses placed in a first slice, all E-UTRAN addresses placed in a second slice.

Modification of IP address space partitioning remains transparent to the slice-specific DNN and the respective services.

According to some examples a plurality of addresses may be allocated to a user equipment. That user equipment may then allocate one or more of those addresses to a plurality of further or other user equipment in a local network. For example the local network may be a local device network e.g. in a car, on a robot etc., where one user equipment or device acts as a gateway or relay for other devices or user equipment.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device e.g. UEs 204, 206 and 208.

Figure 4:
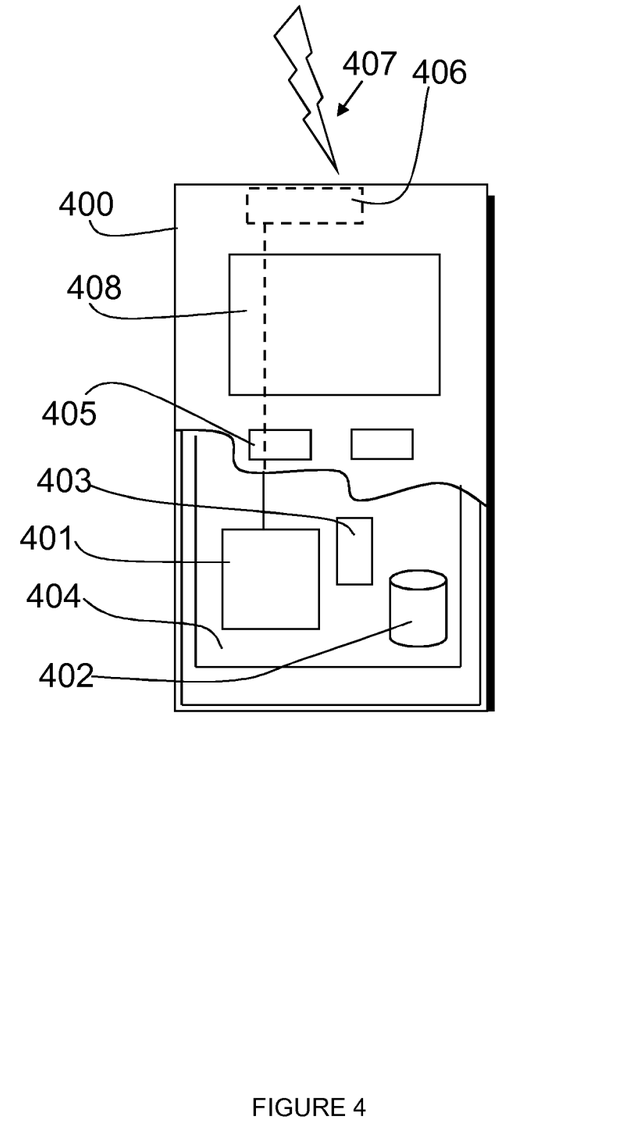
FIG. 4 schematically shows a user equipment according to an example.

An example of a UE 400 is shown in FIG. 4.

The UE 400 may receive signals over an air or radio interface 407 via appropriate apparatus for receiving and may transmit signals via appropriate apparatus for transmitting radio signals. In FIG. 4 transceiver apparatus is designated schematically by block 406. The transceiver apparatus 406 may be provided for example by means of a radio part and associated antenna arrangement. The antenna arrangement may be arranged internally or externally to the wireless device.

A UE is typically provided with at least one data processing entity 401, at least one memory 402 and other possible components 403 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 404. The user may control the operation of the wireless device by means of a suitable user interface such as key pad 405, voice commands, touch sensitive screen or pad, combinations thereof or the like. A display 408, a speaker and a microphone can be also provided. Furthermore, a wireless communication device may comprise appropriate connectors (either wired or wireless) to other devices and/or for connecting external accessories, for example hands-free equipment, thereto. The communication devices 402, 404, 405 may access the communication system based on various access techniques.

Figure 5:
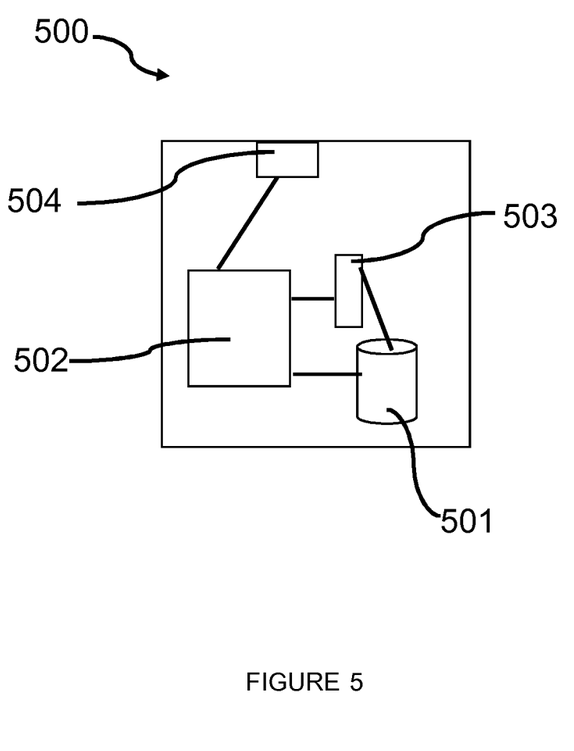
FIG. 5 schematically shows a control apparatus according to an example.

FIG. 5 shows an example of a control apparatus 500 for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host. Such a control apparatus may host functionality such as that of AAPF 340. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 500 can be arranged to provide control on communications in the service area of the system. The control apparatus 500 comprises at least one memory 501, at least one data processing unit 502, 503 and an input/output interface 504. Via the interface the control apparatus can be coupled to a receiver and a transmitter of the base station. The receiver and/or the transmitter may be implemented as a radio front end or a remote radio head. For example the control apparatus 500 can be configured to execute an appropriate software code to provide the control functions.

Figure 6:
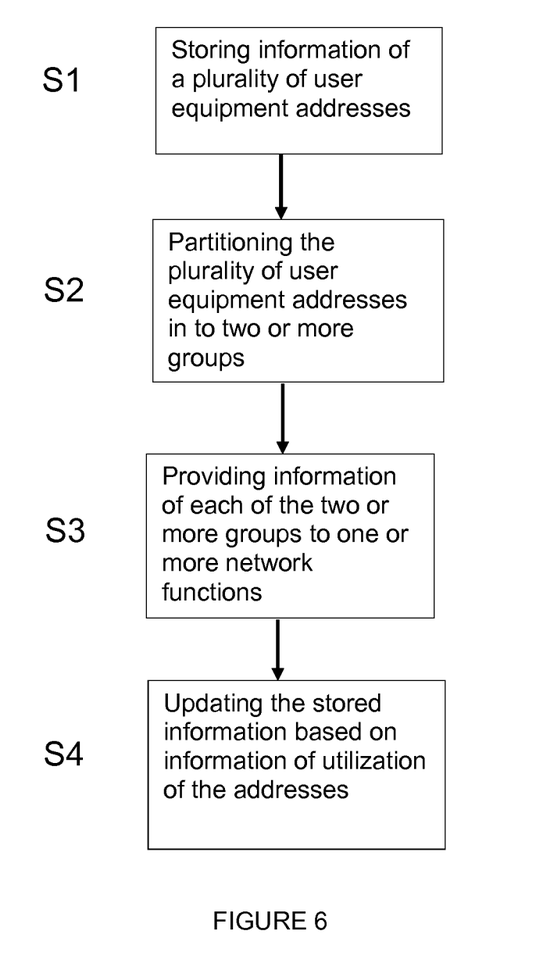
FIG. 6 is a flow chart of a method according to an example.

FIG. 6 is a flow chart of a method according to an example. The method of FIG. 6 may be carried out at an apparatus or node. The apparatus or node may comprise, for example, an address allocation policy function.

At S1, the method comprises storing information of a plurality of user equipment addresses. The user equipment addresses are allocated to one or more network slices. In some examples the user equipment addresses have already been allocated to the one or more network slices. Or in some examples the method comprises a pre-step of allocating the user equipment addresses to one or more network slices.

At S2 the method comprises partitioning the plurality of user equipment addresses in to two or more groups.

At S3 the method comprises providing information of each of the two or more groups to one or more network functions in a network or network slice.

At S4 the method comprises updating the stored information of a plurality of user equipment addresses based on information of utilization of the addresses.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising at least one processor and at least one memory including computer program code, the at least one memory and the computer program code configured to, with the at least one processor, cause the apparatus at least to perform:
   storing information of a plurality of user equipment addresses, the user equipment addresses allocated to one or more network slices, wherein the user equipment addresses comprise internet protocol addresses;
   partitioning the plurality of user equipment addresses into two groups, a first of the two groups comprising a first range of user equipment addresses for subscribers of a first radio access type and a second of the two groups comprising a second range of user equipment addresses for subscribers of a second radio access type;
   providing information of an address range of each of the two groups to one or more network functions in a network or network slice; and
   updating the address range of each of the two groups based on information of utilization of the addresses.

2. An apparatus according to claim 1, wherein the providing information of each of the two groups comprises sending information of the first group to a first network function of a first network associated with the first radio access type, and sending information of the second group to a second network function of a second network associated with the second radio access type.

3. An apparatus according to claim 1, wherein the utilization information comprises information of one or more of: addresses that are in use; addresses that are available; or location information of user equipment associated with the addresses.

4. An apparatus according to claim 1, wherein the at least one memory and the computer program code are further configured to, with the at least one processor, cause the apparatus to perform receiving information updates of one or more subscribers.

5. An apparatus according to claim 4, wherein the at least one memory and the computer program code are further configured to, with the at least one processor, cause the apparatus to perform the updating the stored information of a plurality of user equipment addresses based at least in part on the received information updates of one or more subscribers.

6. An apparatus according to claim 1, wherein the partitioning the plurality of user equipment addresses into two groups comprises allocating the first of the two groups to a first network slice, and allocating the second of the two groups to a second network slice.

7. An apparatus according to claim 1, wherein the at least one memory and the computer program code are further configured to, with the at least one processor, cause the apparatus to perform requesting usage of a portion of the plurality of user equipment addresses from the one or more network functions.

8. An apparatus according to claim 1, wherein the at least one memory and the computer program code are further configured to, with the at least one processor, cause the apparatus to perform allocating a plurality of addresses to a user equipment; and wherein said user equipment is configured to allocate said addresses to a plurality of further user equipment in a local network.

9. A method comprising:
   storing information of a plurality of user equipment addresses, the user equipment addresses allocated to one or more network slices, wherein the user equipment addresses comprise internet protocol addresses;
   partitioning the plurality of user equipment addresses into two groups, a first of the two groups comprising a first range of user equipment addresses for subscribers of a first radio access type and a second of the two groups comprising a second range of user equipment addresses for subscribers of a second radio access type;
   providing information of an address range of each of the two groups to one or more network functions in a network or network slice; and
   updating the address range of each of the two groups based on information of utilization of the addresses.

10. A method according to claim 9, wherein the partitioning the plurality of user equipment addresses in to two groups comprises allocating the first of the two groups to a first network slice, and allocating the second of the two or more groups to a second network slice.

11. A method according to claim 9, further comprising requesting usage of a portion of the plurality of user equipment addresses from the one or more network functions.

12. A method according to claim 9, further comprising allocating a plurality of addresses to a user equipment; and wherein said user equipment is configured to allocate said addresses to a plurality of further user equipment in a local network.

13. A non-transitory computer readable medium comprising program instructions for causing an apparatus to perform at least the following:
   storing information of a plurality of user equipment addresses, the user equipment addresses allocated to one or more network slices, wherein the user equipment addresses comprise internet protocol addresses;
   partitioning the plurality of user equipment addresses into two groups, a first of the two groups comprising a first range of user equipment addresses for subscribers of a first radio access type and a second of the two groups comprising a second range of user equipment addresses for subscribers of a second radio access type;
   providing information of an address range of each of the two groups to one or more network functions in a network or network slice; and
   updating the address range of each of the two groups based on information of utilization of the addresses.

* * * * *

UNITED STATES PATENT AND TRADEMARK OFFICE
CERTIFICATE OF CORRECTION

PATENT NO. : 11,765,575 B2
APPLICATION NO. : 17/299411
DATED : September 19, 2023
INVENTOR(S) : Andreas Maeder et al.

It is certified that error appears in the above-identified patent and that said Letters Patent is hereby corrected as shown below:

On the Title Page

Item (72), Inventors, Line 1, delete "Wiirzburg" and insert -- Würzburg --, therefor.

Signed and Sealed this
Fifth Day of March, 2024

Katherine Kelly Vidal
*Director of the United States Patent and Trademark Office*